United States Patent [19]
Lubowitz et al.

[11] 3,708,370
[45] Jan. 2, 1973

[54] PROCESS FOR BONDING SURFACES WITH POLYIMIDE PREPOLYMERS

[75] Inventors: Hyman R. Lubowitz, Redondo Beach; Eugene A. Burns, Palos Verdes Estates; John F. Jones, Torrance, all of Calif.

[73] Assignee: TRW Inc., Redondo Beach, Calif.

[22] Filed: Aug. 6, 1971

[21] Appl. No.: 169,868

Related U.S. Application Data

[63] Continuation of Ser. No. 703,905, Feb. 8, 1968, abandoned.

[52] U.S. Cl. ............. 156/331, 161/203, 161/227, 161/DIG. 4, 260/78 TF, 260/78.4 R
[51] Int. Cl. ....................... C09j 5/06, C08g 20/00
[58] Field of Search....260/78.4, 78 TF, 47; 156/331; 161/227, DIG. 4; 117/161 UN

[56] References Cited

UNITED STATES PATENTS

| | | | |
|---|---|---|---|
| 3,528,950 | 9/1970 | Lubowitz | 260/78.4 |
| 3,326,863 | 6/1967 | Tatum et al. | 260/78.4 |
| 3,632,428 | 1/1972 | Lubowitz et al. | 117/161 |
| 3,549,603 | 12/1970 | Chenevey et al. | 260/78.4 |

Primary Examiner—James A. Seidleck
Assistant Examiner—John Kight, III

[57] ABSTRACT

This invention relates to a high-temperature adhesive composition and to a method using same which comprises low-molecular weight polyimide prepolymers obtained by coreacting a polyfunctional amine, a polyanhydride and a monoanhydride characterized by the formula:

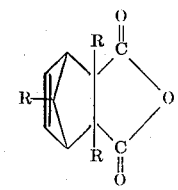

wherein R is selected from the group consisting of hydrogen and lower alkyl radicals.

5 Claims, No Drawings

PROCESS FOR BONDING SURFACES WITH POLYIMIDE PREPOLYMERS

This application is a continuation of copending application Ser. No. 703,905, filed Feb. 8, 1968, now abandoned.

This invention is directed to the preparation of a high-temperature adhesive composition and to a method of using same which comprises a polyimide prepolymer obtained by coreacting a polyfunctional amine, a polyanhydride and a specific monoanhydride. More specifically, the prepolymers used in obtaining the novel adhesives are prepared by reacting a polyfunctional amine, preferably a diamine; a polyanhydride, preferably a dianhydride; and a specific monoanhydride characterized by the formula:

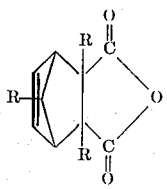

wherein R is selected from the group consisting of hydrogen and lower alkyl radicals.

The polyimide prepolymers defined herein may be employed as an adhesive between materials by using conventional processing techniques. The prepolymers may be applied to various adherends by coating them, for example, with a melt, a slurry, or a varnish of the prepolymers. Simultaneously with the volatilization of the solvents and by-products, the coated adherends are pressed together at an elevated temperature to form the adhesive bond. The resulting joint may be used in the neat form or it may be reinforced with glass, silicon, graphite, etc., by incorporating these materials into the prepolymer. Because the adhesive adhers to a variety of different materials, including metals, non-metals, ceramics, etc., and yields tough, thermally stable adhesive bonds, it may be utilized in a large number of applications, particularly in high-performance aircraft, leading edges of structures, re-entry glider nosecaps, and other structures requiring adhesive bonds of appreciable strengths over a wide temperature range.

Accordingly, it is an object of this invention to provide an adhesive composition comprising polyimides which yield thermally and oxidatively stable adhesive bonds.

It is another object of this invention to provide a method of preparing a polyimide adhesive which is readily processable from the prepolymer; and is characterized by rapid curing with the evolution of only a small amount of volatile material.

It is still another object of this invention to provide a stable prepolymer from which the adhesive is prepared which is characterized as exhibiting long-term shelf-like in the precured state under the environmental use of extreme temperatures and humidity.

It is still a further object of this invention to provide a polyimide adhesive and a method of preparing same which can be processed economically into a stable adhesive joint.

These and other objects of the invention will become apparent from a further and more detailed description as follows.

The polyimide prepolymers from which the adhesives are prepared have average molecular weights preferably in the range of 500 to 3,000 and are obtained by coreacting predetermined amounts of a polyfunctional amine, a polyanhydride, and a specific monoanhydride. When desired, one or more species of the above compounds may be employed in the preparation of the polyimide prepolymer. The prepolymer is primarily a chain extended polymer characterized by an aliphatic and/or aromatic group inter-connected by imide groups, and chain terminated by a chemical group coming from the monoanhydride. Although the terminal group is stable at room or at moderately elevated temperatures, it becomes chemically reactive at elevated temperatures; thereupon, causing the polyimide prepolymer chains to react together to form macromolecules having average molecular weights of about 10,000 or over.

An important feature of this invention is that the higher molecular weight polyimide macromolecules may be obtained thermally from the polyimide prepolymers which are relatively hydrolytically and thermally stable. Thus, special or extraordinary handling precautions are not required when the polyimide prepolymers of this invention are employed. In contrast, the precursors of known polyimides, i.e., polyamide-acids, must be stored under refrigeration and in hermetically sealed containers. Therefore, the processing advantages afforded by the prepolymers of this invention, for example, permit metal to be coated with the polyimide-prepolymers and then stored without employing special precautions, and allow subsequent bonding of the metal at a convenient time.

The coated adherends may be joined together by employing moderate pressures at elevated temperatures. The preferred temperature range, however, is about 600° F., plus or minus 60°. A stable adhesive bond may be formed in approximately ½ to 2 hours under these conditions. The preferred pressure is approximately 200 psi; nevertheless, suitable adhesive bonds may be formed at pressures ranging from less than atmospheric to about 1000 psi at temperatures ranging from about 390° F. to 660° F. At approximately 600° F., it is postulated that the terminal groups of the polyimide-prepolymers completely coreact; thereby, yielding macromolecules by essentially an end-to-end polymerization of the monomeric units. The volatile matter evolved is mainly of a non-aqueous composition and constitutes a small percentage of the resin mass.

The adhesives of this invention are obtained from polyimide prepolymers which are prepared by condensing stoichiometric amounts of at least one polyamine, preferably an aromatic diamine; at least one polyanhydride, preferably an aromatic dianhydride; and preferably a single specific monoanhydride, e.g., 3-6-endomethylene-1,2,3,6-tetrahydrophthalic anhydride or 3,6-endomethylene-5-methyl-1,2,3,6-tetrahydrophthalic anhydride. The specific monoanhydrides may be characterized by the formula:

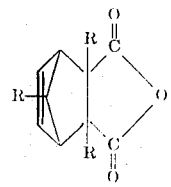

wherein R represents a member selected from a group consisting of hydrogen and a lower alkyl radical, such as methyl, ethyl, propyl, butyl, amyl, etc.

The polyimide prepolymers from which the adhesive bond is obtained by pyrolytic polymerization may be characterized by the following structure:

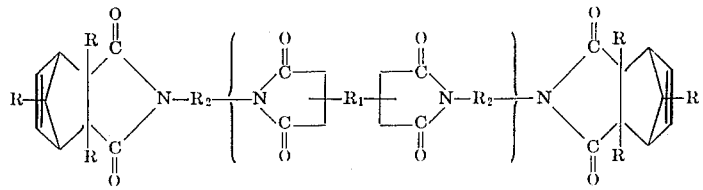

wherein R represents hydrogen or a lower alkyl group and $R_1$ and $R_2$ represent an aliphatic and/or aromatic group and the value of n is in the range 0 to 8.

Suitable polyfunctional amines for preparation of the polyimide prepolymers of this invention include the diamines or triamines and in certain instances tetramines. The following is a representative number of the polyfunctional amines which may be used in preparing the polyimide prepolymers and include, for example, para-phenylene diamine, meta-phenylene diamine, 4,4'-diamino-diphenyl propane, 4,4'diamino-diphenyl methane, benzidine, 4,4'-diamino-diphenyl sulfide, 4,4'-diamino-diphenyl sulfone, 3,3'-diamino-diphenyl sulfone, 4,4'-diamino-diphenyl ether, 1-5-diamino-naphthalene, 3,3'-dimethoxy benzidine, 2,4-bis (beta-amino-t-butyl) toluene, bis-(para-beta-amino-t-butyl-phenyl) ether, bis-(para-beta-methyl-delta-amino-pentyl) benzene, bis-para-(1,1-dimethyl-5-amino-pentyl)benzene, 1-isopropyl-2, 4-metaphenylene diamine, m-xylylene diamine, hexamethylene diamine, heptamethylene diamine, octamethylene diamine, nonamethylene diamine, decamethylene diamine, diamino-propyl tetramethylene diamine, 3-methylheptamethylene diamine, 4,4-dimethyl-heptamethylene diamine, 2,11-diamino-dodecane, 1,2-bis-(3-amino-propoxy)ethane, 2,3-dimethyl propylene diamine, 3-methoxy-hexamethylene diamine, 3,3'-dimethyl benzidine, 2,-5-dimethylhexamethylene diamine, 2,5-dimethyl-heptamethylene diamine, 5-methyl-nonamethylene diamine, 2,17-diamino-dicosadecane, 1,4-diamino-dicosadecane, 1,4-diamino-cyclohexane, 1,10-diamino-1, 10-dimethyl decane, 1,12-diamino-octadecane, and triamines such as, 1,3,5-triaminobenzene, 2,4,6 -triamino-s-triazine, 1,2,3-triaminopropane, 4,4'4"-triaminotriphenyl methane, and 4,4'4"-triaminotriphenylcarbinol.

The polyfunctional anhydrides which may be employed in the preparation of the polyimide prepolymers of the invention are generally dianhydrides although the tri and tetra anhydrides may be utilized. A representative number of the polyfunctional anhydrides include the following:

Pyromellitic dianhydride
Benzophenone tetracarboxylic dianhydride
2,3,6,7-naphthalene tetracarboxylic dianhydride
3,3',3,4'-diphenyl tetracarboxylic dianhydride
1,2,5,6-naphthalene tetracarboxylic dianhydride
2,2',3,3'-diphenyl tetracarboxylic dianhydride
2,2-bis(3,4-dicarboxyphenyl) propane dianhydride
3,4,9,10-perylene tetracarboxylic dianhydride
bis(3,4-dicarboxyphenyl) ether dianhydride
ethylene tetracarboxylic dianhydride
naphthalene-1,2,4,5-tetracarboxylic dianhydride
naphthalene-1,4,5,8-tetracarboxylic dianhydride
decahydronaphthalene-1,4,5,8-tetracarboxylic dianhydride
4,8-dimethyl-1,2,3,5,6,7-hexahydronaphthalene-1,2,5,6-tetracarboxylic dianhydride
2,6-dichloronaphthalene-1,4,5,8-tetracarboxylic dianhydride
2,7-dichloronaphthalene-1,4,5,8-tetracarboxylic dianhydride
2,3,6,7-tetrachloronaphthalene-1,4,5,8-tetracarboxylic dianhydride
phenanthrene-1,8,9,10-tetracarboxylic dianhydride
cyclopentane-1,2,3,4-tetracarboxylic dianhydride
pyrrolidine-2,3,4,5-tetracarboxylic dianhydride
pyrazine-2,3,5,6-tetracarboxylic dianhydride
2,2-bis(2,3dicarboxyphenyl)propane dianhydride
1,1-bis(2,3-dicarboxyphenyl)ethane dianhydride
1,1-bis(3,4-dicarboxyphenyl)ethane dianhydride
bis(2,3-dicarboxyphenyl)methane dianhydride
bis(3,4-dicarboxyphenyl)methane dianhydride
bis(3,4-dicarboxyphenyl)sulfone dianhydride
benzene-1,2,3,4-tetracarboxylic dianhydride
1,2,3,4-butane tetracarboxylic dianhydride
thiophene-2,3,4,5-tetracarboxylic dianhydride The following examples are illustrations of the many embodiments which may be employed in preparing the prepolymers for purposes of this invention.

EXAMPLE I

Approximately 40.7 parts by weight of 4,4'-methylenedianiline, 32.8 parts by weight of 3,6-endomethylene-1,2,3,6-tetrahydrophthalic anhydride, and 33.9 parts by weight of 3,3',4,4'-benzophenone tetracarboxylic acid dianhydride were dissolved in 170 ml dimethylformamide and 400 ml toluene. The solution was refluxed for 18 hours during which time water was collected by means of the Dean Stark receiver. During this reflux period, a cloudy solid phase formed in the solution. At the end of the refluxing period, the solution was cooled to room temperature and filtered. A precipitate or insoluble fraction was collected and dried overnight at 110° C. under vacuum. The filtrate was slowly poured into 3 liters of rapidly stirring water, and stirring was continued overnight. During the stirring, a second precipitate formed and was collected by filtration and dried overnight at 110° C. under vacuum. The first and second dried precipitates were separately ground into a fine powder with a mortor and pestle. Yields for the first and second precipitates were 32.9 parts by weight and 60.9 parts by weight, respectively. The light yellow second fraction was determined to melt between 158° to 180° C.

EXAMPLE II

A solution was prepared by mixing 1000 ml dimethylformamide and 100 ml toluene to which 122.7 parts by weight a 4,4'-oxydianiline was added. The solution was stirred until all the diamine was in solution, and 98.4 parts by weight of 3,6-endomethylene-1,2,3,6-tetrahydrophthalic anhydride was added slowly and stirred until dissolved. Approximately 100.8 parts by weight of 3,3',4,4'-benzophenone tetracarboxylic acid dianhydride was added to the solution, and the solution was refluxed for 18 hours, during which time water was collected by means of a Dean Stark receiver. At the end of the refluxing period, the solution was cooled to room temperature and filtered. A precipitate was collected and dried overnight at 110° C. under vacuum. The filtrate was slowly poured into 10 liters of rapidly stirring water and stirred overnight. A second precipitate was collected by filtration and dried overnight at 110° C. under vacuum. The first and second precipitates were separately ground into a fine powder with a mortar and pestle. Yields for the first and second precipitates were 208.0 parts by weight (mp.270°–280° C.) and 97.7 parts by weight (mp 165°–190° C.), respectively.

EXAMPLE III

Approximately 87.0 parts by weight of 4,4'-Oxydianiline were dissolved in a solvent mixture of 700 ml dimethylformamide and 700 ml toluene. To this solution is added 65.6 parts by weight of 3,6-endomethylene-1,2,3,6-tetrahydrophthalic anhydride and 63.0 parts by weight of 1,4,5,8-naphthalenetetracarboxylic dianhydride. The solution was refluxed for 18 hours and the water collected in a Dean Stark receiver. The solution was cooled to room temperature and filtered. A precipitate was collected and dried overnight at 110° C. under vacuum. The filtrate was slowly poured into seven liters of rapidly stirring water and stirring was continued overnight. A second precipitate was collected by filtration and dried overnight at 110° C. under vacuum. The first and second precipitates were separately ground to a fine powder. Yields for the first and second precipitates were 64.0 parts by weight (mp.>300°C.) and 134.3 parts by weight (mp. 205°–250° C.), respectively.

In preparing the polyimide prepolymer, the material generally fractionates into two molecular weight ranges. The lowest molecular weight material is usually soluble in known solvents, e.g., 1-methyl-pyrrolidone while the higher molecular weight material is generally insoluble in solvents. The total polyimide prepolymer preparation may be milled in a suitable fluid to produce a mixture similar to that used in preparing conventional adhesive coatings. The low molecular weight prepolymer generally dissolves in the fluid which acts as a milling medium and either alone or in combination with other known solvents acts as the entraining vehicle for the higher molecular weight prepolymer which is necessary for processing the adhesive. The final properties of the adhesives, such as hardness, strength of adhesion, etc., may be controlled by adjustment of ratio of the high and low molecular weight components.

The thickness of a coating of the polyimide prepolymer mixture which is sprayed, for example, on a adherend will depend upon the solids content and fluidity of the mixture. Fluid vehicles with solid contents up to approximately 50 percent and preferably 15 –30 percent may be prepared without severely affecting either the viscosity, coating thickness or processing conditions.

In preparing the adhesive, the polyimide prepolymer may be comminuted to a suitable particle size. One of the factors governing the selection of the particle size of the prepolymer is the viscosity of the adhesive coating. Particles which are too coarse, for example, will not readily dissolve or be suitably suspended in the solvent. In addition, other problems relating to the method of applying the adhesive coating also dictate the maximum size of the particles which may be used. In coating the adherend by spraying, for example, prevention of clogging of the spraying nozzle may require a range of particle sizes finer than the range required in other coating techniques, e.g., flow coating the adhesive onto a surface. At the other end of the scale, the criteria for the minimum particle size will depend upon the economics of size reduction and the viscosity. Generally, viscosity will exhibit an inverse relationship to the particle size, i.e., viscosity will increase as the particle size decreases. Although the adjustment of particle size is a factor which can be used to adjust the process conditions in applying the adhesive, it has been found that particles ranging from 10 to 15 microns are satisfactory for most applications.

The various solvents which may be used in preparing the adhesive coating are well-known and may include organic liquids such as furfural, 1-methyl-2-pyrrolidone, butyrolactone, etc. The solvents dissolve the lower molecular weight fraction of the prepolymer and provide a vehicle for dispersing the high molecular weight fraction to form a solution-suspension. The high molecular weight and the low molecular weight fractions of the prepolymer may be ground prior to being added to the solvent or large granule particles of the prepolymer may be added to the solvent and subsequently ground using the solvent as the milling media. An alternative procedure for preparing the adhesive joint comprises impregnating silica or some other known reinforcement material with the solution-suspension of the mixed molecular weight prepolymers. Upon removing the solvent by standard air-drying techniques, a coated or impregnated reinforced material containing from about 30 to 40 percent of the prepolymers is obtained which may be used in subsequent processing by simply applying the reinforced material between the two adherends immediately prior to heating under pressure. This technique provides a convenient means for preparing the adhesives in a controlled manner for subsequent use in the field. Since the prepolymers of this invention have demonstrated long-term storability at moderate temperatures, the self-life of the reinforced adhesive sheet is also very good.

As an alternative, various materials may be coated with a solution of the polyamide-acid which is a precursor of the polyimide prepolymers of this invention; thereupon forming the polyimide prepolymer upon the surface of the material by heating it at moderately elevated temperatures. Subsequently, the materials may be adhesively bonded by pressing them together at still higher temperatures. In this manner, the use of solution-suspension adhesive compositions may be avoided in those instances wherein the particulate form of the adhesive is not desired.

Typical adhesive joints prepared by using the polyimide resins of this invention have given high-shear strengths at ambient temperatures after being aged at 600° F. for about 100 hours. The volatile material evolved during the processing of the adhesive was generally found to be less than 2 percent, excluding the solvent.

Adherends which have been coated with the prepolymer or adherends having the preimpregnated reinforced sheets in between can be joined by utilizing a mechanical press heated to temperatures of about 600° F. at approximately 200 psig, or higher, pressures for a period of about 30 minutes or more. It should by understood that the temperature, pressure and duration of bonding will vary, however, depending upon the actual chemical constituents of the prepolymer and the type of surfaces being joined.

The methods and techniques which may be employed in applying a coating of the adhesive for purposes of bonding various surfaces together may be found in applicant's copending application Ser. No. 686,802 filed on Nov. 30, 1967.

While this invention has been described with respect to a number of specific embodiments, it is obvious that there are other variations and modifications which can be resorted to without departing from the spirit and scope of the invention as particularly pointed out in the appended claims.

We claim:

1. A process for bonding surfaces together which comprises applying, onto said surfaces from an organic solvent, a layer of a polyimide prepolymer having an average molecular weight ranging from about 500–3000 and bonding them together under pressures ranging up to about 1,000 psig and at temperatures ranging from about 390° to about 660° F.; said polyimide prepolymer obtained by coreacting a polyfunctional amine, a polyanhydride and a monoanhydride having the formula:

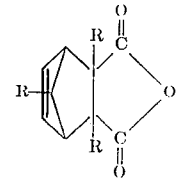

wherein R represents a member selected from the group consisting of hydrogen and a lower alkyl radical.

2. The process of claim 1 further characterized in that the polyfunctional amine is 4,4'-methylenedianiline and the polyanhydride is 3,3',4,4'-benzophenone tetracarboxylic-acid dianhydride.

3. The process of claim 1 further characterized in that the polyfunctiOnal amine is 4,4'-oxydianiline, the polyanhydride is 1,4,5,8-napthaline tetracarboxylic dianhydride and the monoanhydride has the formula wherein R is a methyl radical.

4. The process of claim 1 further characterized in that a reinforcing material impregnated with said polyimide prepolymer is placed between the surfaces to be bonded prior to applying pressure at an elevated temperature.

5. The process of claim 1 further characterized in that that the reinforcing material is glass cloth.

* * * * *